(12) United States Patent
Stenfort

(10) Patent No.: US 7,210,090 B1
(45) Date of Patent: Apr. 24, 2007

(54) METHOD AND APPARATUS FOR VENDOR-SPECIFIC DEVICE COMMUNICATION

(75) Inventor: Ross Stenfort, San Jose, CA (US)

(73) Assignee: Adaptec, Inc., Milpitas, CA (US)

( * ) Notice: Subject to any disclaimer, the term of this patent is extended or adjusted under 35 U.S.C. 154(b) by 537 days.

(21) Appl. No.: 10/733,152

(22) Filed: Dec. 10, 2003

(51) Int. Cl.
*H03M 13/00* (2006.01)

(52) U.S. Cl. .................................................. 714/758
(58) Field of Classification Search ................ 714/758
See application file for complete search history.

(56) References Cited

U.S. PATENT DOCUMENTS 6,856,623 B2 * 2/2005 Hamasaki et al. .......... 370/390

* cited by examiner

*Primary Examiner*—Shelly Chase
(74) *Attorney, Agent, or Firm*—Martine Penilla & Gencarella, LLP (57) ABSTRACT

Broadly speaking a method and an apparatus is disclosed for enabling vendor-specific communication between devices of a common vendor. More specifically, the present invention provides a method and an apparatus for using vendor-specific cyclic redundancy check (CRC) data to identify a communication as containing vendor-specific data. The method and apparatus of the present invention does not inhibit compatibility between the vendor device and another device operating in accordance with a standard communication protocol. Additionally, the method and apparatus of the present invention allows the devices of the common vendor to implement features and functionality that rely on efficient and protected vendor-specific communication.

23 Claims, 6 Drawing Sheets

METHOD AND APPARATUS FOR VENDOR-SPECIFIC DEVICE COMMUNICATION

BACKGROUND OF THE INVENTION

1. Field of the Invention

The present invention relates generally to communication between electronic devices. More specifically, the present invention relates to a method and an apparatus for performing vendor-specific communication between electronic devices.

2. Description of the Related Art

Modern computing systems generally include a number of target devices in communication with one or more initiator devices. For example, the initiator device may be a host computer and the target device may be a hard drive connected as a peripheral device. Communication (i.e., data transfer) protocols, such as IDE and SCSI, are used to enable communication between initiator devices and target devices. Standard communication protocols have been developed to ensure communication compatibility between initiator devices and target devices. The standard communication protocols provide rigid frameworks and processes for conducting data transfers between devices. For example, Serial Attached SCSI (SAS) represents a set of standard protocols used for communicating between SCSI devices. SAS includes standard communication protocols such as a Serial ATA Tunneled Protocol (STP), a Serial Management Protocol (SMP), and a Serial SCSI Protocol (SSP).

Figure 1:
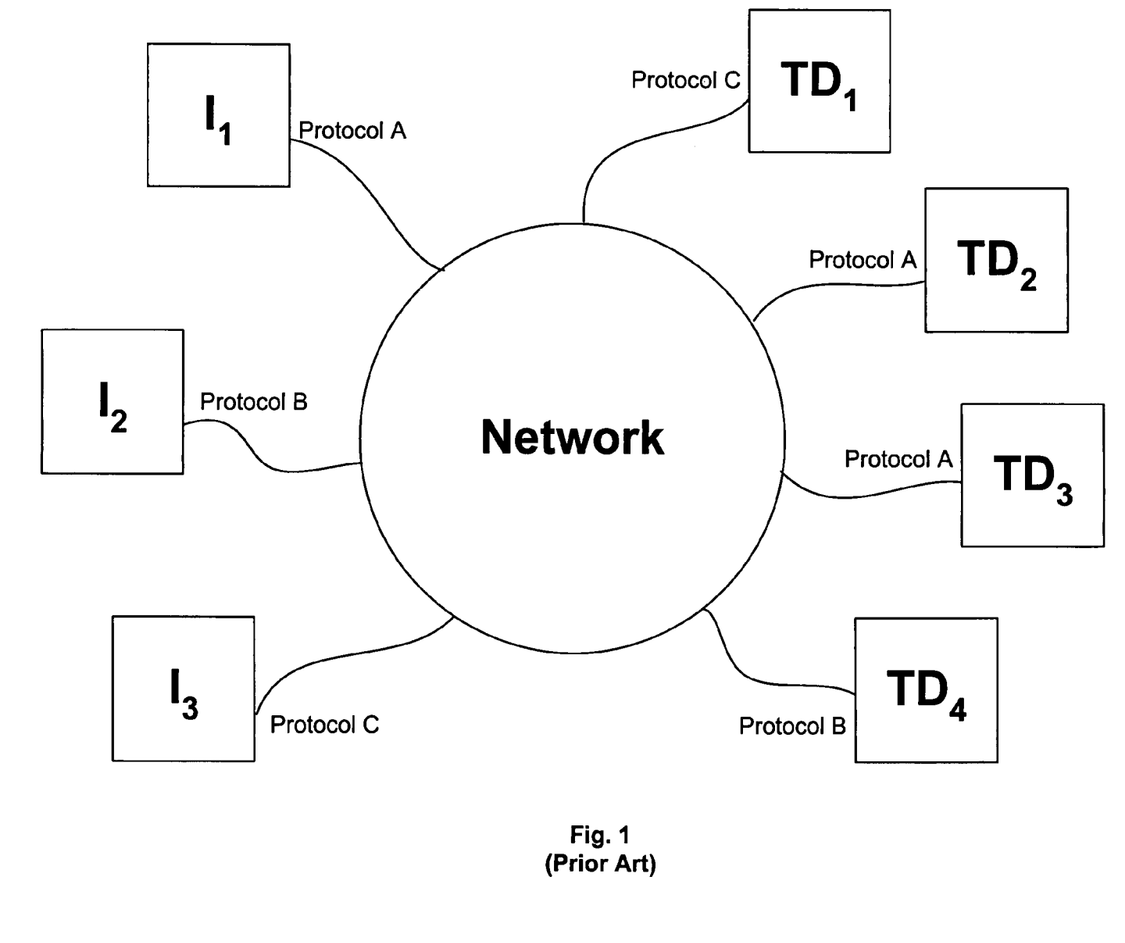
FIG. 1 is an illustration showing a number of initiator devices ($I_1$–$I_3$) and a number of target devices ($TD_1$–$TD_4$) networked to communicate with each other using standard communication protocols, in accordance with the prior art.

FIG. 1 is an illustration showing a number of initiator devices ($I_1$–$I_3$) and a number of target devices ($TD_1$–$TD_4$) networked to communicate with each other using standard communication protocols, in accordance with the prior art. Communication between the initiator devices ($I_1$–$I_3$) and the target devices ($TD_1$–$TD_4$) is facilitated by a network. The network can be as simple as a switch or as complex as a series of independent computing systems. Generally speaking, for two devices to communicate (i.e., initiator device-to-target device, target device-to-initiator device, or initiator device-to-initiator device), both devices must be configured to implement a common standard communication protocol. For example, since the initiator device $I_1$ and the target devices $TD_2$ and $TD_3$ each implement a Protocol A, these devices can communicate according to the framework and process defined by Protocol A. In a similar manner, initiator device $I_2$ and target device $TD_4$ can communicate according to the framework and process defined by Protocol B. Also, initiator device $I_3$ and target device $TD_1$ can communicate according to the framework and process defined by Protocol C. However, initiator devices ($I_1$–$I_3$) cannot communicate with target devices ($TD_1$–$TD_4$) that are not configured to implement a common standard communication protocol, vice versa. The use of standard communication protocols, as discussed above, enables compatibility between devices of different vendors.

Figure 2:
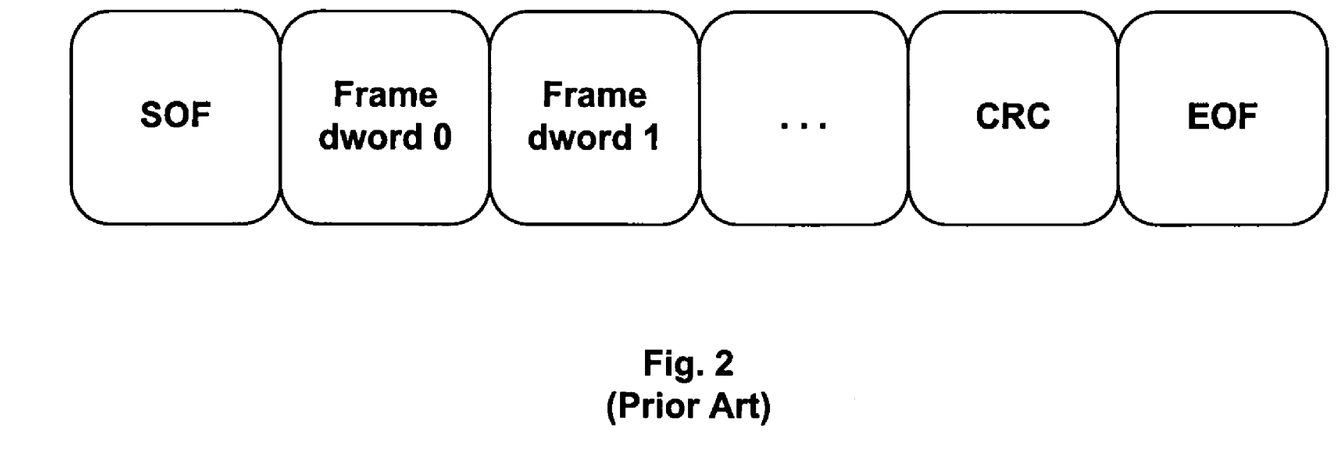
FIG. 2 is an illustration showing a standard frame structure implemented within a standard communication protocol, in accordance with the prior art.

FIG. 2 is an illustration showing a standard frame structure implemented within a standard communication protocol, in accordance with the prior art. The standard frame structure includes a Start of Frame primitive (SOF). A series of dwords follow the SOF. Each dword represents a set of contiguous bytes or contiguous characters considered as a unit. The standard protocol dictates a type of data that can be included within each dword. A set of cyclic redundancy check (CRC) data follows the series of dwords. The CRC data represents a checksum used to confirm the integrity of the data received in the frame. The frame concludes with an End of Frame primitive (EOF).

Occasionally, it may be desirable to communicate vendor-specific data between devices of a common vendor. For example, the vendor-specific data may be used to implement a unique feature of the target device that is made available only by the target device vendor. Thus, the vendor-specific data in conjunction with the unique feature of the target device may provide the vendor with a competitive advantage. However, the standard frame structures associated with the standard communication protocols are quite limited with respect to an amount of vendor-specific data that can be included. Generally, such vendor-specific data can only be included in a limited number of reserved locations within the standard frame. The reserved locations are typically designated as reserved bytes or a limited number of pre-designated vendor-specific fields contained within the standard frame.

However, using the reserved locations to carry the vendor-specific data introduces complications. For example, devices from other vendors may be expecting particular types of data to be contained within the reserved locations. Thus, use of the reserved locations by multiple vendors to carry different types of data introduces incompatibility issues. Introducing incompatibility issues between devices runs contrary to the primary intent of standardizing communication protocols. Another complication arises in the inability to protect vendor-specific data contained within the reserved locations from interception by competing vendor devices. Interception of vendor-specific data by a competing vendor device may result in a loss of the competitive advantage expected to be gained by using the vendor-specific data.

In view of the foregoing, there is a need for a method and an apparatus that will allow for more efficient and protected vendor-specific communication between devices of a common vendor without rendering them incompatible with devices of other vendors.

SUMMARY OF THE INVENTION

Broadly speaking a method and an apparatus is disclosed for enabling vendor-specific communication between devices of a common vendor. More specifically, the present invention provides a method and an apparatus for using vendor-specific cyclic redundancy check (CRC) data to identify a communication as containing vendor-specific data. Since only devices of the common vendor are capable of recognizing the vendor-specific CRC data and processing the vendor-specific data contained within the communication, devices of other vendors will interpret the vendor-specific CRC data as being invalid standard CRC data. The vendor device can be configured to recognize and process both standard communications and vendor-specific communications. Thus, the method and apparatus of the present invention does not inhibit compatibility between the vendor device and another device operating in accordance with a standard communication protocol. Additionally, the method and apparatus of the present invention allows the devices of the common vendor to implement features and functionality that rely on efficient and protected vendor-specific communication.

In one embodiment, a method for communicating vendor-specific data between devices is disclosed. The method includes transmitting a vendor-specific communication having vendor-specific CRC data from a first device to a second device. The first device and the second device are associated with a common vendor. The method also includes recognizing and processing the vendor-specific CRC data at the second device.

In another embodiment, a method for performing vendor-specific device communication is disclosed. The method includes generating a communication including vendor-specific data and vendor-specific CRC data. The method also includes transmitting the communication from a first device to a second device. A CRC check is performed at the second device. The method further includes recognizing the vendor-specific CRC data as having been generated using a vendor-specific CRC data generation method. In response to recognizing the vendor-specific data, the communication is processed in accordance with a vendor-specific protocol.

In yet another embodiment, a method for operating a device is disclosed. The method includes receiving a communication that includes CRC data. The method also includes performing a vendor-specific CRC data check of the CRC data. If the CRC data is determined to be valid vendor-specific CRC data, the communication is recognized as containing vendor-specific data. In response to recognizing the communication as containing vendor-specific data, the communication is processed in accordance with a vendor-specific protocol. The method also includes performing a standard CRC data check of the CRC data. If the CRC data is determined to be valid standard CRC data, the communication is processed in accordance with a standard protocol. The method further includes identifying the CRC data as being invalid CRC data. The invalid CRC data does not represent either valid vendor-specific CRC data or valid standard CRC data. If the CRC data is determined to be invalid CRC data, the communication is processed in accordance with the standard protocol.

In another embodiment, a device having vendor-specific communication capability is disclosed. The device includes a first set of circuitry configured to receive a communication including CRC data from an initiator device. The device also includes a second set of circuitry configured to perform a vendor-specific CRC data check of the CRC data. The second set of circuitry is capable of identifying the CRC data as representing valid vendor-specific CRC data. Identification of the valid vendor-specific CRC data indicates inclusion of vendor-specific data within the communication. The device further includes a third set of circuitry configured to process the communication in accordance with a vendor-specific protocol.

Other aspects of the invention will become more apparent from the following detailed description, taken in conjunction with the accompanying drawings, illustrating by way of example the present invention.

BRIEF DESCRIPTION OF THE DRAWINGS

The invention, together with further advantages thereof, may best be understood by reference to the following description taken in conjunction with the accompanying drawings in which.

DETAILED DESCRIPTION

Broadly speaking a method and an apparatus is disclosed for enabling vendor-specific communication between devices of a common vendor. More specifically, the present invention provides a method and an apparatus for using vendor-specific cyclic redundancy check (CRC) data to identify a communication as containing vendor-specific data. Since only devices of the common vendor are capable of recognizing the vendor-specific CRC data and processing the vendor-specific data contained within the communication, devices of other vendors will interpret the vendor-specific CRC data as being invalid standard CRC data. The vendor device can be configured to recognize and process both standard communications and vendor-specific communications. Thus, the method and apparatus of the present invention does not inhibit compatibility between the vendor device and another device operating in accordance with a standard communication protocol. Additionally, the method and apparatus of the present invention allows the devices of the common vendor to implement features and functionality that rely on efficient and protected vendor-specific communication.

It should be appreciated that the present invention can be implemented in numerous ways, including as a process, an apparatus, a system, a device, or a method. Several exemplary embodiments of the invention will now be described in detail with reference to the accompanying drawings.

In the following description, numerous specific details are set forth in order to provide a thorough understanding of the present invention. It will be apparent, however, to one skilled in the art that the present invention may be practiced without some or all of these specific details. In other instances, well known process operations have not been described in detail in order not to unnecessarily obscure the present invention.

Figure 3:
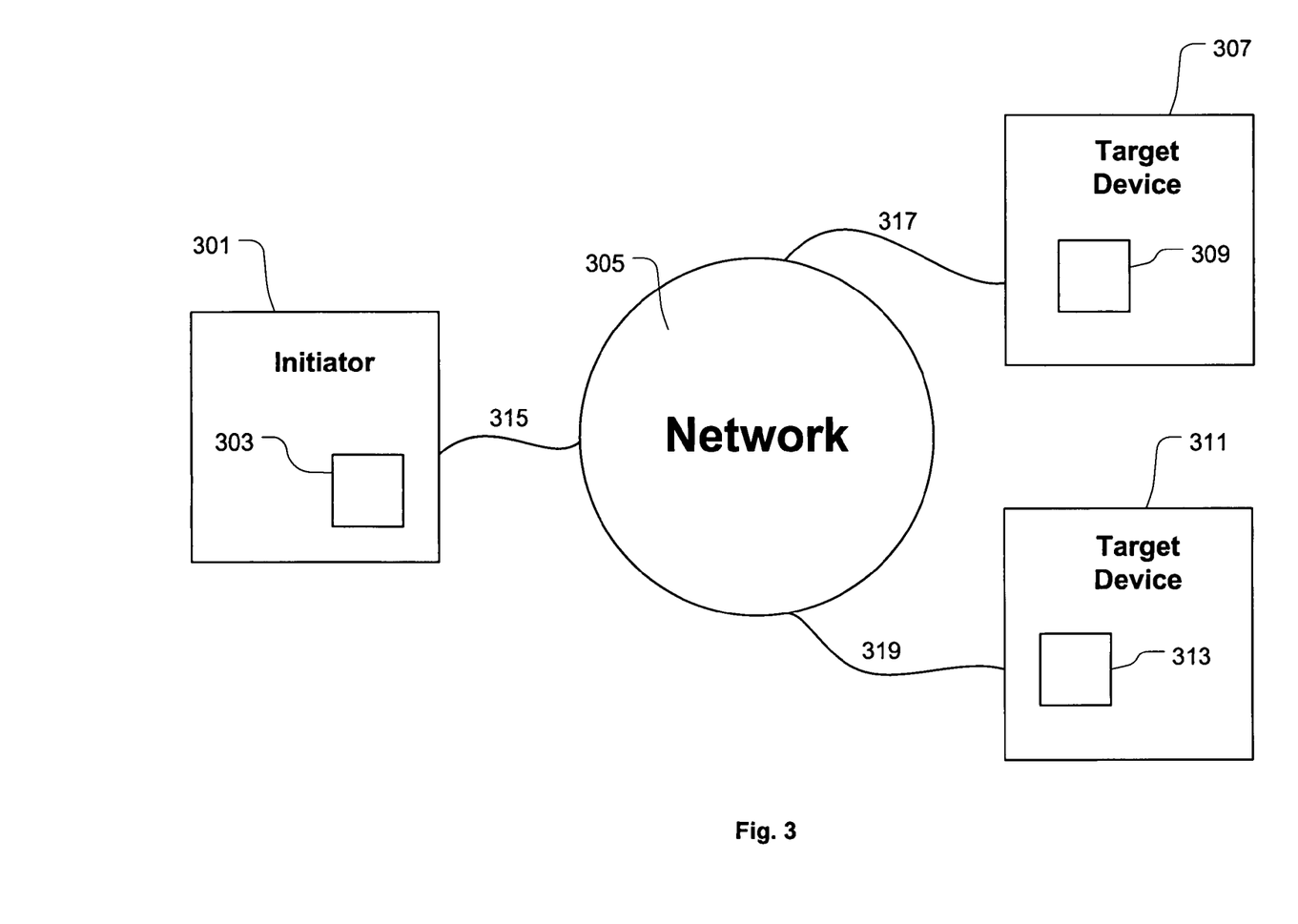
FIG. 3 is an illustration showing an initiator device networked to communicate with target devices, in accordance with one embodiment of the present invention.

FIG. 3 is an illustration showing an initiator device 301 networked to communicate with target devices 307 and 311, in accordance with one embodiment of the present invention. Each of the initiator device 301 and the target devices 307 and 311 can represent any type of electrical device configured to communicate with another electrical device using a standard communication protocol. Additionally, devices commonly referred to as "initiator devices" can also act as target devices in certain situations. For example, each of the initiator device 301 and the target devices 307 and 311 can be SCSI devices configured to use a standard communication protocol from a Serial Attached SCSI (SAS) set of standard protocols. SAS includes standard communication protocols such as a Serial ATA Tunneled Protocol (STP), a Serial Management Protocol (SMP), and a Serial SCSI Protocol (SSP). It should be understood, however, that association of the SAS set of protocols with the initiator device 301 and the target devices 307 and 311 is made for exemplary purposes, and that other standard protocols may be equally utilized.

The initiator device 301 is connected to a network 305 through a connection 315. The target devices 307 and 311 are also connected to the network 305 through connections 317 and 319, respectively. In this manner, the network 305 allows the initiator device 301 to communicate with each of the target devices 307 and 311. In the present embodiment, the network 305 can be as simple as a switch or as complex as a series of independent computing systems. Regardless of its physical embodiment, the network 305 should be capable of transmitting communications from the initiator device 301 to the target devices 307 and 311, vice versa, without modifying the communications.

Both the initiator device 301 and the target device 307 are equipped with communication chips 303 and 309, respectively, of a common vendor. The target device 311 is equipped with a communication chip 313 of a different vendor. The communication chip 303 is configured to communicate with both the communication chips 309 and 313, vice versa, using a standard communication protocol. Additionally, in accordance with one embodiment of the present invention, the communication chips 303 and 309 are also configured to communicate with each other in a vendor-specific manner. Thus, the initiator device 301 and the target device 307, having communication chips 303 and 309 from the common vendor, can communicate in either the vendor-specific manner or using the standard communication protocol. However, the initiator device 301 and the target device 311, having communication chips 303 and 313 from different vendors, can communicate using only the standard communication protocol.

It should be understood that the communication chips 303 and 309 contain circuitry that is configured to process electrical signals in a well-defined manner to provide a specific operational behavior. The specific operational behavior can be represented as a particular method for processing data. In following, the communication chips 303 and 309 from the common vendor are configured to operate in accordance with a method of the present invention that enables communication in the vendor-specific manner. The method of the present invention for enabling vendor-specific communication is described below with respect to FIGS. 4, 5, and 6.

Figure 4:
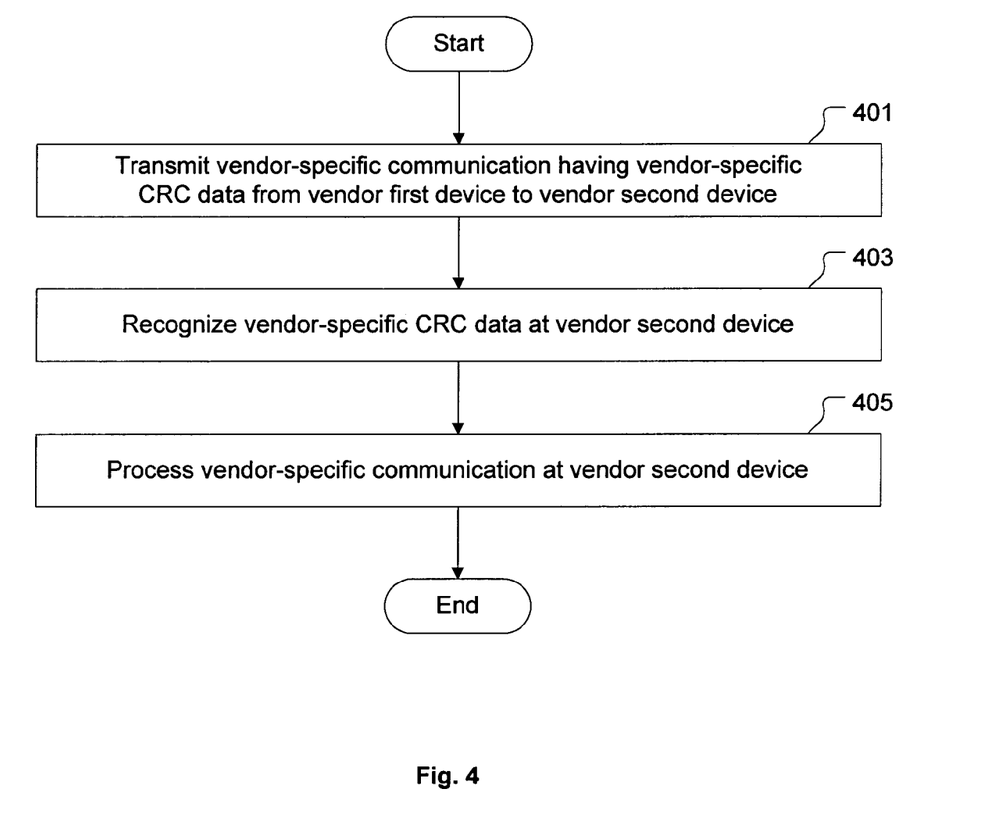
FIG. 4 is an illustration showing a flowchart of a method for communicating vendor-specific data between devices, in accordance with one embodiment of the present invention.

FIG. 4 is an illustration showing a flowchart of a method for communicating vendor-specific data between devices, in accordance with one embodiment of the present invention. The method includes an operation 401 in which a vendor-specific communication is transmitted from a first device to a second device. The first device and the second device are associated with a common vendor. Association of the first and second devices with the common vendor allows each of the devices to include circuitry that provides for recognizing and processing of the vendor-specific communication. Other devices that are not associated with the common vendor will not be privy to the circuitry requirements for recognizing and processing the vendor-specific communication.

Standard communications include standard cyclic redundancy check (CRC) data for ensuring the integrity of the data contained within the received communication. It should be appreciated by those skilled in the art that standard CRC data represents a checksum used to detect transmission errors. In a manner similar to the standard communication, the vendor-specific communication includes vendor-specific CRC data for ensuring the integrity of the data contained within the received communication. However, the vendor-specific CRC data contained within the vendor-specific communication is not equivalent to standard CRC data. Rather, the vendor-specific CRC data is defined specifically to be recognized and processed by devices associated with the common vendor. To devices that are not associated with the common vendor, the vendor-specific CRC data will be interpreted as standard CRC data containing one or more errors (i.e., invalid standard CRC data). Thus, devices that are not associated with the common vendor will not be able to recognize and process the vendor-specific CRC data.

The vendor-specific CRC data is generated using a vendor-specific CRC data generation method. In one embodiment, the vendor-specific CRC data generation method includes use of a vendor-specific seed value in conjunction with a standard CRC data generation method. In other words, a standard protocol CRC generator is initialized to a unique value different than the value required by the standard protocol, thus causing unique vendor-specific CRC data to be generated. In another embodiment, the vendor-specific CRC data generation method includes use of a vendor-specific CRC data generation formula that is different from the standard CRC generation formula. For example, in one embodiment, a vendor-specific CRC data generation formula is used in lieu of a Serial ATA CRC generation formula represented by the polynomial $X^{32}+X^{26}+X^{23}+X^{22}+X^{16}+X^{12}+X^{11}+X^{10}+X^{8}+X^{7}+X^{5}+X^{4}+X^{2}+X+1$.

In one embodiment, the vendor-specific communication conforms to a communication frame structure associated with a standard communication protocol, but not with a communication frame content associated with the standard communication protocol. Thus, in this embodiment, the vendor-specific CRC data will be provided just prior to an End of Frame (EOF) primitive. Also, in this embodiment, the content of each dword contained within the frame can be arbitrarily established to comply with vendor-specific needs. Furthermore, since the vendor-specific communication conforms to the standard communication protocol frame structure, transmission of the vendor-specific communication can be performed in accordance with the standard communication protocol.

In another embodiment, the vendor-specific communication does not conform to the standard communication protocol in either structure or content. In this embodiment, the vendor-specific communication is defined in a manner that can only be recognized and processed by properly equipped devices of the common vendor. However, the vendor-specific communication of this embodiment continues to be identified by vendor-specific CRC data contained therein.

The method of FIG. 4 continues with an operation 403 in which the vendor-specific CRC data is recognized upon receipt of the vendor-specific communication at the second device. The second device associated with the common vendor is defined to examine CRC data associated with an incoming communication to determine whether the CRC data corresponds to standard CRC data or vendor-specific CRC data. Therefore, a vendor-specific CRC data check is performed by the second device to determine whether the incoming communication contains vendor-specific CRC data. The vendor-specific CRC data check is also capable of determining whether there are any errors in the vendor-specific CRC data (i.e., whether the vendor-specific CRC data is valid).

Once an incoming vendor-specific communication is recognized as containing valid vendor-specific CRC data, the method continues with an operation 405 in which the vendor-specific communication is processed at the second device. In one embodiment, processing of the vendor-specific communication at the second device includes processing the vendor-specific communication in accordance with a vendor-specific protocol. The first and second devices associated with the common vendor are configured to generate and process, respectively, the vendor-specific communication in accordance with the vendor-specific protocol. It should be appreciated that the vendor-specific protocol can be defined in any suitable manner to satisfy communication needs of the vendor-specific devices.

A standard CRC data check and a vendor-specific CRC data check can be performed on each communication frame received by the second device. The CRC data check (i.e., either standard or vendor-specific) resulting in valid CRC data indicates whether the communication complies with the standard protocol or contains vendor-specific data. Thus, the vendor-specific CRC data serves to identify the vendor-specific communication as such, while assisting in detection of transmission errors in the vendor-specific communication. Furthermore, the first and second devices associated with the common vendor can be configured to communicate in the vendor-specific manner without inhibiting an ability to communicate in accordance with a standard protocol.

Figure 5:
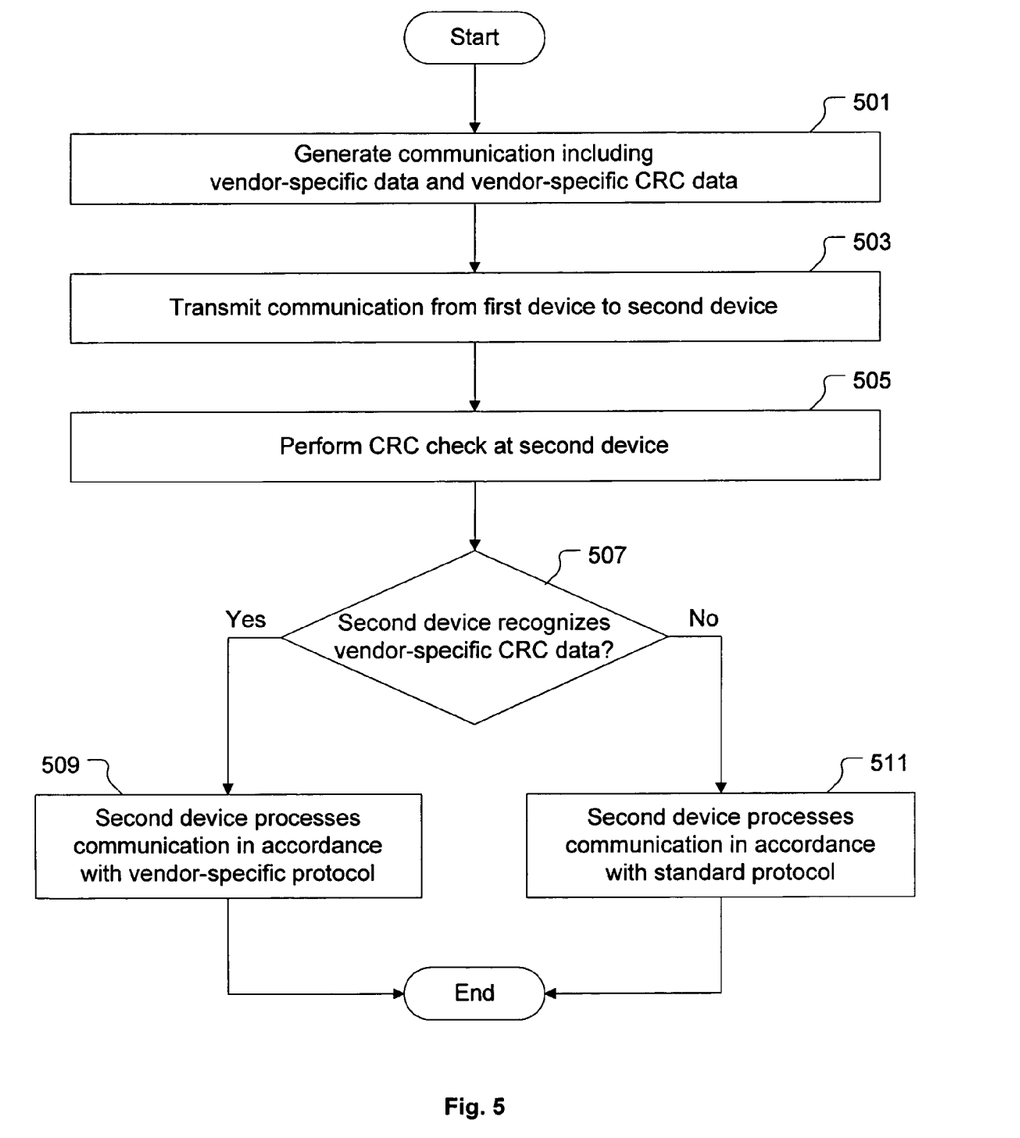
FIG. 5 is an illustration showing a flowchart of a method for performing vendor-specific device communication, in accordance with one embodiment of the present invention.

FIG. 5 is an illustration showing a flowchart of a method for performing vendor-specific device communication, in accordance with one embodiment of the present invention. The method includes an operation 501 for generating a communication that includes both vendor-specific data and vendor-specific CRC data. As previously discussed, the vendor-specific CRC data can be generated in a number of ways so long as the vendor-specific CRC data is exclusively recognizable and interpretable by devices associated with the common vendor. In one embodiment, the vendor-specific CRC data is generated using a vendor-specific seed value in conjunction with a standard CRC data generation method. In another embodiment, the vendor-specific CRC data generation method includes use of a vendor-specific CRC data generator polynomial.

The method continues with an operation 503 for transmitting the communication from a first device to a second device. In one embodiment, transmission of the communication from the first device to the second device is performed using a standard communication protocol. In an operation 505, a CRC check is performed at the second device. In one embodiment, the CRC check is performed at the second device using a vendor-specific CRC data checker. An operation 507 is then performed for determining whether or not vendor-specific CRC data is recognized by the second device.

If vendor-specific CRC data is recognized by the second device in the operation 507, the method proceeds to an operation 509 in which the second device processes the communication in accordance with a vendor-specific protocol. In one embodiment, the vendor-specific CRC data also indicates a type of vendor-specific data included in the communication. In an expansion of this embodiment, the type of vendor-specific data corresponds to one of a number of different types of vendor-specific data for which the vendor-specific CRC data can be tailored to signify.

If valid vendor-specific CRC data is not recognized by the second device in the operation 507, the method proceeds to an operation 511 in which the second device processes the communication in accordance with a standard protocol. In one embodiment, vendor-specific CRC data is recognized as being present in the communication, but the vendor-specific CRC data contains an error. In this embodiment, operation 511 will include processing the communication in accordance with the standard protocol by sending a negative acknowledge (NAK) response from the second device to the first device. In another embodiment, the communication contains standard CRC data rather than vendor-specific CRC data. In this embodiment, processing the communication in accordance with the standard protocol in operation 511 is equivalent to a normal processing of the standard communication.

Figure 6:
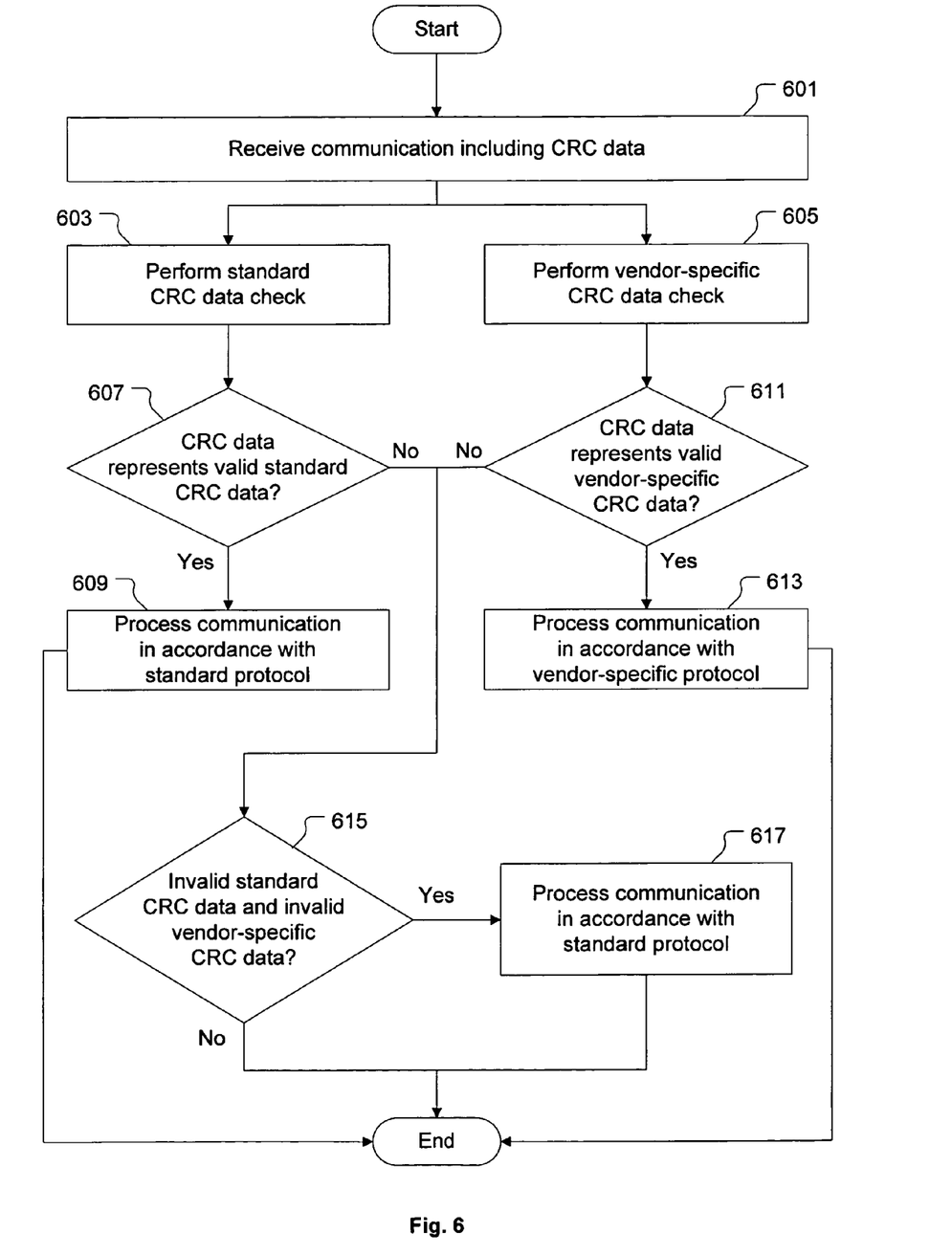
FIG. 6 is an illustration showing a flowchart of a method for operating a target device, in accordance with one embodiment of the present invention.

FIG. 6 is an illustration showing a flowchart of a method for operating a device, in accordance with one embodiment of the present invention. The method includes an operation 601 for receiving a communication including CRC data at the device. In one embodiment, the communication is received according to the procedures of a standard protocol.

Once the communication is received in operation 601, an operation 605 is conducted to perform a vendor-specific CRC data check. An operation 611 is provided for determining whether the CRC data contained within the communication represents valid vendor-specific CRC data. If the CRC data contained within the communication is determined to represent valid vendor-specific CRC data, the method proceeds to an operation 613 in which the communication is processed in accordance with a vendor-specific protocol. The vendor-specific protocol used to process the received communication is compatible with the vendor-specific protocol used to generate the communication. Therefore, the vendor-specific communication will be correctly processed.

Once the communication is received in operation 601, an operation 603 is performed in addition to the operation 605 previously discussed. In the operation 603, a standard CRC data check is performed. An operation 607 is provided for determining whether the CRC data contained within the communication represents valid standard CRC data. If the CRC data contained within the communication is determined to represent valid standard CRC data, the method proceeds to an operation 609 in which the communication is processed in accordance with a standard protocol.

An operation 615 is provided for determining whether the CRC data contained within the communication represents invalid CRC data. Invalid CRC data represents neither valid standard CRC data nor valid vendor-specific CRC data. Upon determining the CRC data to be invalid in operation 615, the method proceeds to an operation 617 in which the communication is processed in accordance with a standard protocol. In one embodiment, processing the communication having invalid CRC data includes sending a NAK response from the device to another device from which the communication was sent.

Although the flowchart operations above have been described in a particular order, it should be understood that the order of execution may differ. In one example, the order of execution may proceed in parallel or serially depending on the specific algorithm and hardware implementation. In another example, the order of the functional operations may be rearranged.

The standard protocol for SAS communication includes a well-defined behavior for handling CRC data errors. Thus, when a CRC data error is encountered by a device, the device behaves in a well-defined manner. When communicating in a vendor-specific manner, the CRC data generator associated with the communication can be altered to signal that the communication is to be treated in the vendor-specific manner. Thus, the CRC data in the vendor-specific communication can be used as an identifier. If a non-vendor device receives the communication containing the vendor-specific CRC data, the non-vendor device will simply recognize the communication as containing a CRC data error and respond in accordance with the standard communication protocol.

Thus, use of the vendor-specific CRC generator/data does not introduce compatibility issues with non-vendor devices.

Since only the vendor device will process the communication containing the vendor-specific CRC data, the communication and the vendor device can be configured in any suitable manner. Thus, the vendor-specific communication is not limited by reserved bits, packet fields, or other limitations normally associated with standard communication protocols. Therefore, the present invention provides increased flexibility in communicating between devices from a common vendor and allows for easier addition of compatible features.

With the above embodiments in mind, it should be understood that the present invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general-purpose computer selectively activated or configured by a computer program stored in the computer. In particular, various general-purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data which can be thereafter be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer systems so that the computer readable code is stored and executed in a distributed fashion.

While this invention has been described in terms of several embodiments, it will be appreciated that those skilled in the art upon reading the preceding specifications and studying the drawings will realize various alterations, additions, permutations and equivalents thereof. It is therefore intended that the present invention includes all such alterations, additions, permutations, and equivalents as fall within the true spirit and scope of the invention.

What is claimed is:

1. A method for communicating vendor-specific data between devices, comprising:
   transmitting a communication having cyclic redundancy check (CRC) data from a first device to a second device, wherein the first device and the second device are associated with a common vendor;
   performing both a standard CRC data check and a vendor-specific CRC data check at the second device;
   recognizing the communication as a vendor-specific communication when the vendor-specific CRC data check indicates valid vendor-specific CRC data; and
   processing the vendor-specific communication at the second device.

2. A method for communicating vendor-specific data between devices as recited in claim 1, wherein the vendor-specific CRC data is generated using a vendor-specific CRC data generation method.

3. A method for communicating vendor-specific data between devices as recited in claim 2, wherein the vendor-specific CRC data generation method includes use of a vendor-specific seed value in conjunction with a standard CRC data generation method.

4. A method for communicating vendor-specific data between devices as recited in claim 2, wherein the vendor-specific CRC data generation method includes use of a vendor-specific CRC data generation formula.

5. A method for communicating vendor-specific data between devices as recited in claim 1, wherein the vendor-specific communication conforms to a frame structure of a standard protocol.

6. A method for communicating vendor-specific data between devices as recited in claim 1, wherein transmitting the communication is performed in accordance with a standard protocol.

7. A method for communicating vendor-specific data between devices as recited in claim 1, wherein processing the vendor-specific communication at the second device includes processing the vendor-specific communication in accordance with a vendor-specific protocol.

8. A method for communicating vendor-specific data between devices as recited in claim 1, wherein the first device is a first initiator device and the second device is one of a second initiator device and a target device.

9. A method for performing vendor-specific device communication, comprising:
   generating a communication including cyclic redundancy check (CRC) data;
   transmitting the communication from a first device to a second device;
   performing both a standard CRC data check and a vendor-specific CRC data check at the second device;
   processing the communication at the second device in accordance with a vendor-specific protocol when the vendor-specific CRC data check identifies the CRC data of the communication as representing valid vendor-specific CRC data; and
   processing the communication at the second device in accordance with a standard protocol when the standard CRC data check identifies the CRC data of the communication as representing valid standard CRC data.

10. A method for performing vendor-specific device communication as recited in claim 9, wherein the vendor-specific CRC data check is performed using a vendor-specific CRC data checker.

11. A method for performing vendor-specific device communication as recited in claim 9, further comprising:
    recognizing the vendor-specific CRC data as being invalid as a result of performing the vendor-specific CRC check; and
    processing the communication at the second device in accordance with a standard protocol.

12. A method for performing vendor-specific device communication as recited in claim 11, wherein processing the communication in accordance with the standard protocol includes sending a negative acknowledge (NAK) response from the second device to the first device.

13. A method for performing vendor-specific device communication as recited in claim 9, wherein the vendor-specific CRC data is generated using one of a vendor-specific seed value in conjunction with a standard CRC data generation method and a vendor-specific CRC data generator polynomial.

14. A method for performing vendor-specific device communication as recited in claim 9, wherein transmitting the communication from the first device to the second device is performed using a standard protocol.

15. A method for performing vendor-specific device communication as recited in claim 9, wherein the vendor-specific CRC data indicates a type of vendor-specific data included in the communication.

16. A method for operating a device, comprising:
    (a) receiving a communication including cyclic redundancy check (CRC) data;
    (b) performing a vendor-specific CRC data check;
    (c) identifying the CRC data as representing valid vendor-specific CRC data, the valid vendor-specific CRC data indicating inclusion of vendor-specific data within the communication;
    (d) processing the communication in accordance with a vendor-specific protocol in response to identifying the CRC data as representing valid vendor-specific CRC data;
    (e) performing a standard CRC data check;
    (f) identifying the CRC data as representing valid standard CRC data;
    (g) processing the communication in accordance with a standard protocol in response to identifying the CRC data as representing valid standard CRC data;
    (h) identifying the CRC data as being invalid, the invalid CRC data representing other than one of valid vendor-specific CRC data and valid standard CRC data; and
    (i) processing the communication in accordance with the standard protocol in response to identifying the CRC data as being invalid.

17. A method for operating a device as recited in claim 16, wherein elements (b) through (d) are performed prior to elements (e) through (g).

18. A method for operating a device as recited in claim 16, wherein elements (b) through (d) are performed in a substantially parallel manner with elements (e) through (g).

19. A method for operating a device as recited in claim 16, wherein receiving the communication is performed in accordance with a standard protocol.

20. A method for operating a device as recited in claim 16, wherein the valid vendor-specific CRC data is generated using one of a vendor-specific seed in conjunction with a standard CRC data generator and a vendor-specific CRC data generator.

21. A method for operating a device as recited in claim 16, wherein the valid vendor-specific CRC data represents a type of vendor-specific data contained within the communication.

22. A device having vendor-specific communication capability, comprising:
    a first set of circuitry configured to receive a communication from an initiator device, the communication including cyclic redundancy check (CRC) data;
    a second set of circuitry configured to perform a vendor-specific CRC data check, the second set of circuitry being capable of identifying the CRC data as representing valid vendor-specific CRC data, the valid vendor-specific CRC data indicating inclusion of vendor-specific data within the communication;
    a third set of circuitry configured to process the communication in accordance with a vendor-specific protocol;
    a fourth set of circuitry configured to perform a standard CRC data check, the fourth set of circuitry being capable of identifying the CRC data as representing valid standard CRC data, the valid standard CRC data indicating conformance of the communication to a standard protocol; and
    a fifth set of circuitry configured to process the communication in accordance with the standard protocol.

23. A device having vendor-specific communication capability as recited in claim 22, further comprising:
    a sixth set of circuitry configured to identify the CRC data as being invalid, the invalid CRC data representing other than one of valid vendor-specific CRC data and valid standard CRC data; and
    a seventh set of circuitry configured to process the communication in accordance with the standard protocol in response to identifying the CRC data as being invalid.

* * * * *